US011776373B2

(12) United States Patent
Merrick

(10) Patent No.: US 11,776,373 B2
(45) Date of Patent: Oct. 3, 2023

(54) SYSTEM AND METHOD FOR DETECTING CHILD DISTRESS AND GENERATING SUGGESTION FOR RELIEVING CHILD DISTRESS

(71) Applicant: Charlotte, What's Wrong? LLC, San Francisco, CA (US)

(72) Inventor: Jason Merrick, Cotati, CA (US)

(73) Assignee: CHARLOTTE, WHAT'S WRONG? LLC, San Francisco, CA (US)

( * ) Notice: Subject to any disclaimer, the term of this patent is extended or adjusted under 35 U.S.C. 154(b) by 93 days.

(21) Appl. No.: 17/182,253

(22) Filed: Feb. 23, 2021

(65) Prior Publication Data

US 2022/0270462 A1  Aug. 25, 2022

(51) Int. Cl.
*G08B 21/02* (2006.01)
*G09B 19/00* (2006.01)
*G10L 25/63* (2013.01)
*G06N 20/00* (2019.01)

(52) U.S. Cl.
CPC ......... *G08B 21/0208* (2013.01); *G06N 20/00* (2019.01); *G09B 19/00* (2013.01); *G10L 25/63* (2013.01)

(58) Field of Classification Search
CPC .... G08B 21/0208; G06N 20/00; G09B 19/00; G10L 25/63
See application file for complete search history.

(56) References Cited

U.S. PATENT DOCUMENTS

| 2003/0063135 | A1* | 4/2003  | Liu            | G16H 20/60 715/864 |
|--------------|-----|---------|----------------|---------------------|
| 2012/0171649 | A1* | 7/2012  | Wander         | G16H 40/63 434/247  |
| 2012/0254196 | A1* | 10/2012 | Abramski       | G16H 20/60 707/748  |
| 2016/0155347 | A1* | 6/2016  | Spivey-Krobath | G09B 5/02 434/262   |
| 2016/0287078 | A1* | 10/2016 | Pradeep        | A61B 5/165          |
| 2021/0295728 | A1* | 9/2021  | Sarrafzadeh    | G10L 15/083         |
| 2022/0058979 | A1* | 2/2022  | Newell         | G06N 5/04           |

* cited by examiner

*Primary Examiner* — Ryan W Sherwin
(74) *Attorney, Agent, or Firm* — Nath, Goldberg & Meyer; Joshua B. Goldberg

(57) ABSTRACT

The present invention provides a system and method for child monitoring. The child monitoring system comprises an audio sensor, a video sensor, an input module, a processing module, and a display module. The audio sensor is configured to capture speech data, the video sensor is configured to capture activity data. The input module is configured to receive one or more child parameters. The processing module is configured to generate a suggestion in response to the computation of the speech data, the activity data, and the one or more child parameters with a suggestion database or a predefined suggestion database. The display module is configured to display the suggestion and prompt a parent to provide an input. Further, the suggestion database is updated in response to the input provided by the parent. The processing module uses one or more machine learning modules to generate the suggestion.

12 Claims, 4 Drawing Sheets

SYSTEM AND METHOD FOR DETECTING CHILD DISTRESS AND GENERATING SUGGESTION FOR RELIEVING CHILD DISTRESS

FIELD OF THE INVENTION

The present invention provides a child monitoring system configured to detect child distress and provide suggestions to a parent, and in particularly, to the system to update a suggestion database in response to an input provided by the parent based on the suggestion outcome.

BACKGROUND OF THE INVENTION

Children often cry for several seasons, for example, hunger, tiredness, discomfort, wet or dirty nappies diapers, or just dreams. The following are some cases of the child crying: the child is hungry or eats too much. The child needs to change clothes or change diapers. The child feels too hot or too cold. The child wants to be carried. The child wants to sleep. In addition to the above reasons, there is a kind of "crying-and-cry" in the night, and the child may cry for any reason at night, sometimes lasts for one or two months, has no body discomfort, is neither hungry, nor sleepy or simply wants to cry, and the child often causes headache for adults.

Common stressors in a child include dirty or wet diapers, pain, gas, hunger, boredom, fatigue, developmental crying (PURPLE crying), fever, reactive airway disease, and more. In particular, PURPLE crying is especially troublesome for parents. Therefore, it may be important to recognize communication factors from child speech, gestures, and other communication cues to determine the emotional or physiological state of the child during an interaction.

In recent years, the use of computerized systems for analyzing communication cues has grown through the implementation of language and gesture interfaces. In the current arts, emotion recognizers operate by assigning category labels to emotional states, such as "angry" or "sad," relying on signal processing and pattern recognition techniques. Emotional recognition may be performed by analyzing speech acoustics and/or facial expressions to target an emotional category or representation. However, none of the prior art systems are able to recognize the emotional state of the child correctly.

Therefore, a child monitoring system is needed for helping parents or other caregivers to monitor child behavior and generate a suggestion to cure child distress.

SUMMARY OF THE INVENTION

Embodiment of the present invention provides a child monitoring system configured to detect when a child is crying or in distress and provide a suggestion to a caretaker or parent of the child.

The present invention provides a child monitoring system comprises of at least one audio sensor, at least one video sensor, an input module, a processing module, and a display module. The at least one audio sensor is located at a first location and is configured to capture a speech data associated with a child. The at least one video sensor is located at a second location and is configured to capture an activity data associated with the child. The input module is configured to receive one or more child parameters. The processing module comprises a speech recognition module, an activity recognition module, and a classifier module. The speech recognition module is configured to receive the speech data from the at least one audio sensor and determine a first category information and a time associated with the first category information in response to the computation of the speech data associated with the child by using a speech recognition machine learning module. The activity recognition module is configured to receive the activity data from the at least one video sensor and determine a second category information in response to the computation of the activity data by using an activity recognition machine learning module. The classifier module is configured to receive the first category information and the time associated with the first category information from the speech recognition module and receive the second category information from the activity recognition module and one or more child parameters from the input module. Further, the classifier module comprises a suggestion machine learning module that is configured to generate a first suggestion in response to the presence of at least one or more suggestions associated with the first category information, the time associated with the first category information, the second category information, and one or more child parameters in a suggestion database, or generate a second suggestion in response to the presence of at least one or more suggestions associated with the first category information, the time associated with the first category information, the second category information, and one or more child parameters in a predefined child development database. The display module is configured to display the first suggestion, or the second suggestion received from the classifier module. The display module is configured to prompt the parent or caretaker to provide input in response to the suggestion displayed by the display module. The input can be YES, the suggestion is helpful, NO the suggestion is not helpful, or the parent can provide a suggestion that enables the child to calm down. Further, the suggestion database is configured to be updated in response to receiving the input, generated from the interaction with the first suggestion, or the second suggestion displayed on the display module, from the display module.

In one exemplary embodiment, the present invention provides a child monitoring method. The method is configured for capturing a speech data associated with a child using an audio sensor, capturing an activity data associated with the child using a video sensor, receiving one or more child parameters, determining a first category information and a time associated with the first category information in response to the computation of the speech data, received by a speech recognition module of a processing module, using a speech recognition machine learning module, determining a second category information in response to the computation of the activity data, received by an activity recognition module of the processing module, using an activity recognition machine learning module. The method is further configured for receiving, by a classifier module of the processing module, the first category information and the time associated with the first category information from the speech recognition module, the second category information from the activity recognition module, and one or more child parameters. The classifier module comprises a suggestion machine learning module configured for generating a first suggestion in response to the presence of at least one or more suggestions associated with the first category information, the time associated with the first category information, the second category information, and one or more child parameters in a suggestion database, or generating a second suggestion in response to the presence of at least one or more suggestions associated with the first category information, the time associated with the first category information, the second category information, and one or more child parameters in a predefined child development database. Further, the method is configured for displaying, by a display module, the first suggestion, or the second suggestion received from the classifier module and updating the suggestion database in response to receiving an input, generated from the interaction with the first suggestion, or the second suggestion displayed on the display module, from the display module.

In one exemplary embodiment, the speech data is at least one of an acoustic data, a lexical data, and a linguistic data. The first category information is at least one of a crying, sad, happy, angry, tired, frustrated, bored, delighted, extremely delighted, discomfort, positive, neutral, negative, very disappointed, hungry, frustrated, confused, overstimulation, development crying, thirst crying, teething crying, and sleepiness. The time can be morning, afternoon, evening, and night.

In yet another exemplary embodiment, the second category information is at least one of the but not limited to running, playing, eating, crawling, lying down, standing up, and sleeping. The one or more child parameters are age, gender, height, and weight.

In yet another exemplary embodiment, the predefined child development database comprises suggestions related to a growing and developing child. For example, the child may be crying due to teething problems, disturbed sleeping, etc.

BRIEF DESCRIPTION OF THE DRAWINGS

Embodiments of the present invention described herein are exemplary, and not restrictive. Embodiments will now be described, by way of examples, with reference to the accompanying drawings. In these drawings, each identical or nearly identical component that is illustrated in various figures is represented by a reference number. For purposes of clarity, not every component is labeled in every drawing. The drawings are not necessarily drawn to scale, with emphasis instead being placed on illustrating various aspects of the techniques and devices described herein.

The foregoing and other objects, aspects, and advantages are better understood from the following detailed description of a preferred embodiment of the invention with reference to the drawings, in which.

DETAILED DESCRIPTION OF THE INVENTION

Overview

With reference to the figures provided, embodiments of the present invention are now described in detail.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Embodiment of the present invention provides a child monitoring system configured to detect when a child is crying or in distress and provide a suggestion to a caretaker or parent of the child. Some embodiments provide a child monitoring method configured for detecting child distress and generating a suggestion in response to the child distress. The child can be an infant, toddler, or 1-2-year-old baby who is unable to express himself/herself. In one embodiment the child can be a 2-5-year-old child who can express themselves through non verbal cues or gestures only.

The child may be become fussy during sleep due to bad dreams, growing pain, digestive problems, stomach discomfort, needed a diaper change, tired, frustrated, bored, discomfort, very disappointed, hunger, confusion, overstimulation, development crying, thirst crying, and sleepiness.

Figure 1:
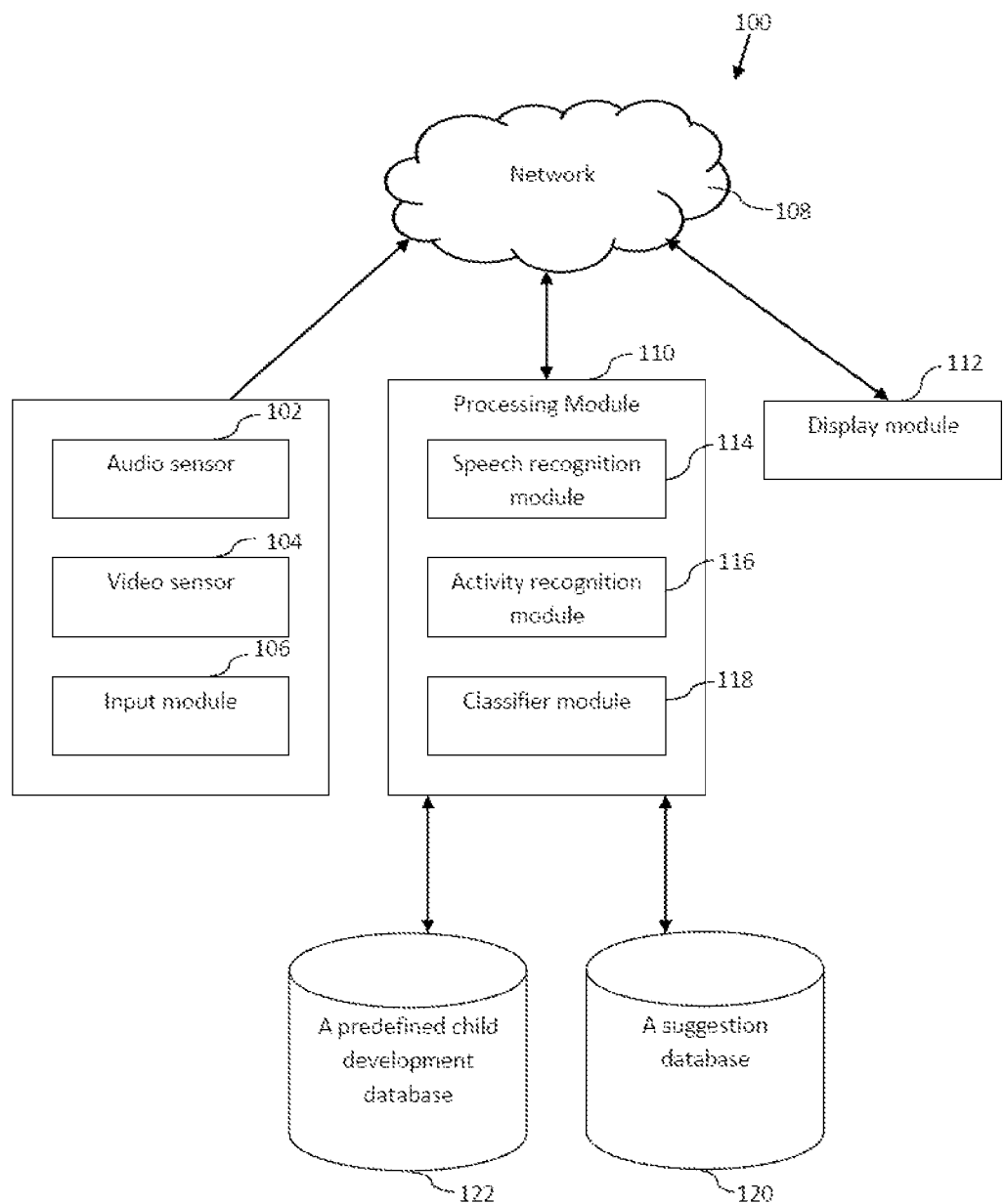
FIG. 1 illustrates a block diagram of the child monitoring system, in accordance with a preferred embodiment of the present invention.

FIG. 1 illustrates a block diagram of the child monitoring system (100), in accordance with a preferred embodiment of the present invention. The child monitoring system (100) comprising at least one audio sensor (102), at least one video sensor (104), an input module (106), a processing module (110), and a display module (112). The at least one audio sensor (102) is located at a first location and is configured to capture a speech data associated with a child. Speech data may include but are not limited to pitch, length, volume, tone, energy, variation, intensity, clustering, and other audio features commonly used for the classification of audio information known in the arts.

The at least one video sensor (104) is located at a second location and is configured to capture an activity data associated with the child. The input module (106) is configured to receive one or more child parameters. The child parameters are at least one of age, gender, height, and weight of the child.

The at least one audio sensor (102), the at least one video sensor (104), and the input module (106) are configured to transmit the speech data, the activity data, and the one or more child parameters to the processing module (110) through a wireless network (108). The wireless network (108) is at least one of a 3G, 4G LTE, 4G WiMAX, WiFi, Bluetooth, SuperWiFi, and another wireless standard.

The processing module (110) comprising a speech recognition module (114), an activity recognition module (116), and a classifier module (118). The processing module (110) is configured to receive the speech data from the at least one audio sensor (102) and determine a first category information and a time associated with the first category information in response to the computation of the speech data associated with the child by using a speech recognition machine learning module. The first category information is at least one of a crying, sad, happy, angry, tired, frustrated, bored, delighted, extremely delighted, discomfort, positive, neutral, negative, very disappointed, hungry, frustrated, confused, overstimulation, development crying, thirst crying, teething crying, and sleepiness. The time can be morning, afternoon, evening, and night. The activity recognition module (116) is configured to receive the activity data from the at least one video sensor (104) and determine a second category information in response to the computation of the activity data by using an activity recognition machine learning module. The second category information is at least one of a but not limited to running, playing, eating, crawling, lying down, standing up, and sleeping.

The classifier module (118) is configured to receive the first category information and the time associated with the first category information from the speech recognition module (114) and receive the second category information from the activity recognition module (116), and one or more child parameters from the input module (106). The classifier module (118) comprises a suggestion machine learning module. The classifier module (118) is configured to generate a first suggestion in response to the presence of at least one or more suggestions associated with the first category information, the time associated with the first category information, the second category information, and one or more child parameters in a suggestion database (120) using the suggestion machine learning module. If the suggestion database (120) does not have any suggestion related to the first category information, the time associated with the first category information, the second category information, and one or more child parameters then the classifier module (118) is configured to generate a second suggestion in response to the presence of at least one or more suggestions associated with the first category information, the time associated with the first category information, the second category information, and one or more child parameters in a predefined child development database (122). The predefined child development database (122) comprises suggestions related to a growing and developing child. For example, the child may be crying due to teething problems, disturbed sleeping, etc. Further, the display module (112) is configured to display the first suggestion, or the second suggestion received from the classifier module (118). The display module (112) can be a user interface of application software running on an electronic device. The electronic device is at least one of a mobile phone, smart phone, laptop, tablet, PDA, desktop, computer, or any other operating system enabled device.

The display module (112) is configured to prompt the parent or caretaker to provide an input in response to the suggestion displayed by the display module (112). The input can be YES, the suggestion is helpful. NO the suggestion is not helpful, or the parent is enabled to provide a suggestion that is helpful for the child to calm down. The system (100) is configured to update the suggestion database (120) in response to the received input from the parent or the caretaker of the child.

The suggestion can be the child is hungry needs milk, the diaper of the child is wet change the diaper, the child has a fever needs seeing a doctor in time, the child is feeling cold wrap the child with warm clothes, the child gets hurt while running calms the child, the child is sleepy let him her sleep, etc.

In one exemplary embodiment, the input module (106) and display module (112) can be the user interface of the software application running on the electronic device. The parent is enabled to create the child profile by providing one or more child parameters (name, age, height, weight, gender). The child profile is stored in the predefined child development database (122) and the suggestion database (120).

In yet another exemplary embodiment, the processing module includes one or more processors coupled to a memory. The processor is configured to receive instructions and data from a read-only memory or a random-access memory or both.

In one exemplary embodiment, the speech data is at least one of an acoustic data (for example energy and pitch), lexical data, and linguistic data. The speech recognition machine learning module is configured to determine a first category information and a time associated with the first category information in response to the computation of the speech data. The speech data comprises signals features related to both verbal and non-verbal cues of the child's behavior. By way of example, the signal features may include acoustic, lexical, or discourse information about the signals. Vocal expressions by the child may include words, utterances, hesitations, and other disfluencies, by way of example.

The speech recognition machine learning module is configured to derive one or more signal features from the received speech data. The speech recognition machine learning module is configured to perform emotional recognition decisions by implementing mapping between the signal features and elements of an emotional ontology.

The emotional ontology provides a gradient representation of the human expressive behavior, i.e., provides much greater flexibility and gradation in symbolic descriptions of human expressive behavior. Typically, user-level description of expressions of emotion (for example linguistic, cognitive, or affective expressions of emotion) has been provided in terms of words or phrases. These words may include the following, by way of example: happy, sad, frustrated, bored, very disappointing, extremely delighted. Many other descriptors may be used. These descriptors have often been the target of automatic classification, in conventional emotional recognition systems.

The emotional ontology or expressive language ontology provides a method of organizing the expressive linguistic space in a way that allows for a flexible and graded representation of the child's emotional states. The emotional ontology is derived from linguistic descriptions such as words and phrases, with or without enriched annotations such as those made available from lexica and other lexical resources. The elements of the emotional ontology may thus include but are not limited to: expressive variables, clusters of expressive variables, and relations between the clusters and/or the variables.

Figure 2:
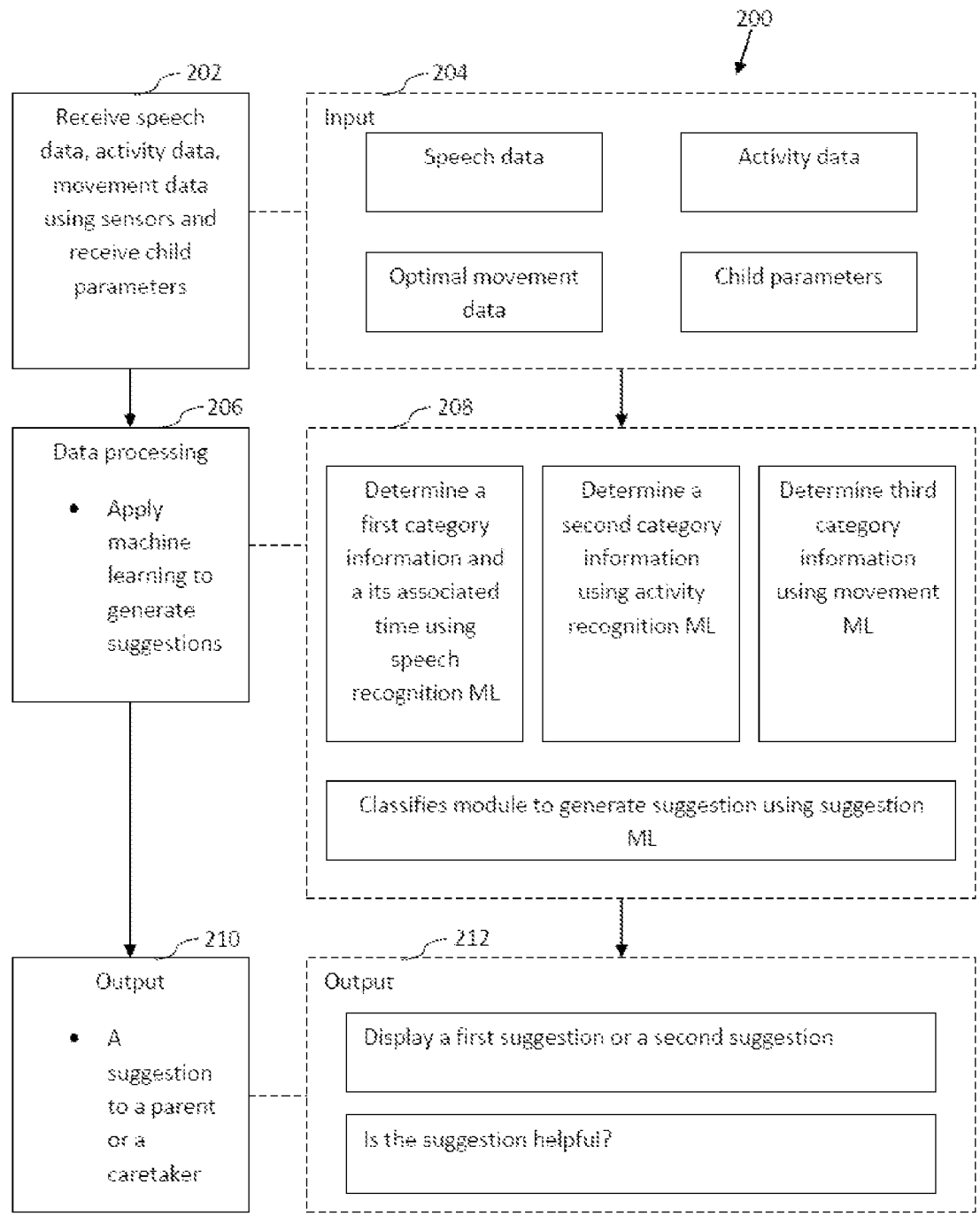
FIG. 2 illustrates an example flow chart of the child monitoring using machine learning, in accordance with an exemplary embodiment of the present invention.

FIG. 2 illustrates an example flow chart (200) of the child monitoring using machine learning, in accordance with an exemplary embodiment of the present invention. In step (202), input data (204), which comprises speech data, activity data, an optional movement data, child parameters are received. In step (206), one or more data processing steps are applied (applying machine learning to generate suggestions). In step (208), determine a first category information and a time associated with the first category information from the received speech data using a speech recognition machine learning module. In one embodiment, the speech recognition machine learning module has been trained on first category training data, wherein the first category training data comprises speech data for one or more sample child, one or more acoustic data, lexical data, and linguistic data extracted from the speech data for the one or more sample infants and one or more category information related to the one or more acoustic data (pitch, length, volume, tone, energy, variation, intensity, clustering, and other audio features), lexical data, and linguistic data.

Again, in step (208), determine a second category information using an activity recognition machine learning module. The activity recognition machine learning module has been trained on activity data for one or more sample child, wherein the activity data comprises the video data related to running, playing, eating, crawling, lying down, sleeping, and standing up, or any other activity patterns of the child.

Again, in step (208), determine a third category information using the movement machine learning module. The movement machine learning module has been trained on movement data for the one or more sample child, wherein the movement data comprises of child body movement, i.e., legs, hands, face, feet, any other movement, or gestures of the child.

Again, in step (208), the classifier module receives the first category information, and the time associated with the first category information, the second category information, the third category information, and the child parameters to generate a suggestion using a suggestion machine learning module. The suggestion machine learning module has been trained to analyze the first category information, the second category information, the third category information, and the child parameter with a suggestion database or a predefined suggestion database to generate a first suggestion or a second suggestion.

In step (210), a suggestion is an output to a parent or a caretaker, shown as output data (212). The output data (212) includes a first suggestion or a second suggestion to the parent or caretaker of the child. The output data (212) also prompts the parent to provide an input whether the suggestion is helpful or not. Further, based on the parent input, the suggestion database is updated.

Figure 3:
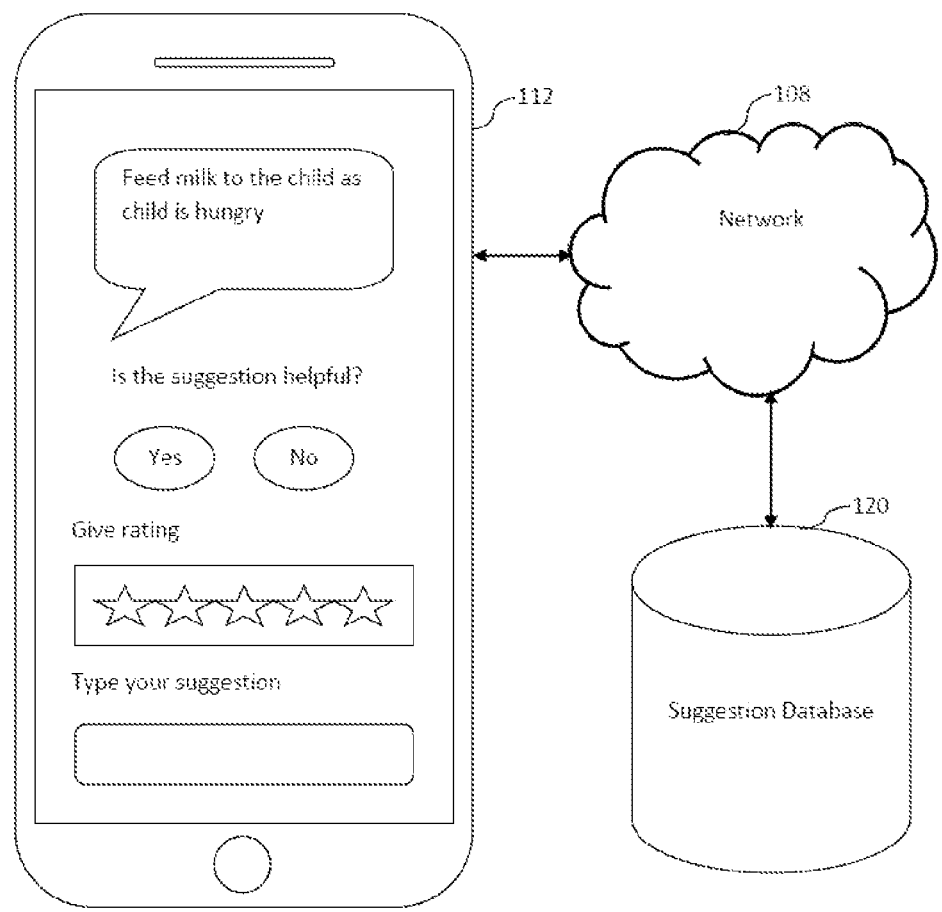
FIG. 3 shows a user interface of the electronic device for providing suggestions and receiving feedback, in accordance with an exemplary embodiment of the present invention.

FIG. 3 shows a user interface of the electronic device for providing suggestions and receiving feedback, and the suggestion database, in accordance with an exemplary embodiment of the present invention. The display module (112) i.e., the user interface of the software application running on the electronic device is enabled to provide a first suggestion from the suggestion database (120) or a second suggestion from the predefined suggestion database. The display module (112) displays "feed milk to the child as the child is hungry". The parent of the child acts accordingly to the displayed suggestion. Further, the parent is enabled to provide an input (Yes or No) for a question "Is this suggestion helpful", or the parent is enabled to provide a star rating, or the parent is enabled to type his her suggestion which is effective in calming the child or reducing the child distress. The display module (112) is enabled to transmit the input to the suggestion database (120) through a network (108). The suggestion database (120) is configured to update the suggestions accordingly to the received input from the parent.

Figure 4:
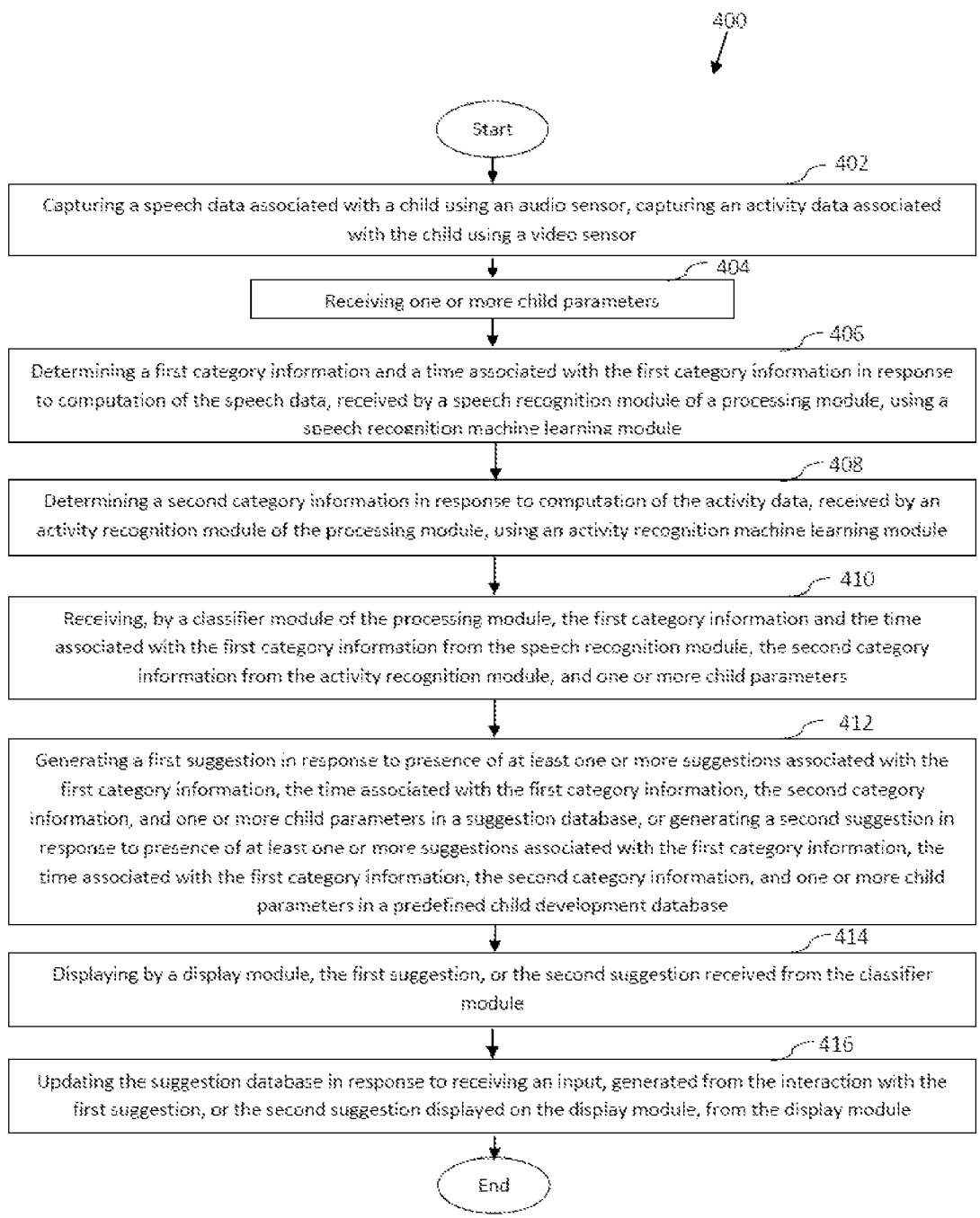
FIG. 4 illustrates a flow chart of a child monitoring method, in accordance with an exemplary embodiment of the present invention.

FIG. 4 illustrates a flow chart of a child monitoring method (400), in accordance with an exemplary embodiment of the present invention. At step (402), capturing a speech data associated with a child using an audio sensor, capturing an activity data associated with the child using a video sensor. At step (404), receiving one or more child parameters. At step (406), determining a first category information and a time associated with the first category information in response to the computation of the speech data, received by a speech recognition module of a processing module, using a speech recognition machine learning module. At step (408), determining a second category information in response to the computation of the activity data, received by an activity recognition module of the processing module, using an activity recognition machine learning module. At step (410), receiving, by a classifier module of the processing module, the first category information and the time associated with the first category information from the speech recognition module, the second category information from the activity recognition module, and one or more child parameters. The classifier module comprises a suggestion machine learning module and is configured for, at step (412), generating a first suggestion in response to the presence of at least one or more suggestions associated with the first category information, the time associated with the first category information, the second category information, and one or more child parameters in a suggestion database, or generating a second suggestion in response to the presence of at least one or more suggestions associated with the first category information, the time associated with the first category information, the second category information, and one or more child parameters in a predefined child development database. At step (414), displaying, by a display module, the first suggestion, or the second suggestion received from the classifier module. At step (416), updating the suggestion database in response to receiving an input, generated from the interaction with the first suggestion, or the second suggestion displayed on the display module, from the display module.

In one exemplary embodiment, the one or more instances of the machine learning modules used in the present embodiments may, for example, utilize hundreds, thousands, tens of thousands, or more artificial neural nodes. Application of one or more artificial neural networks as a component and/or implementation of a component of one or more of the present embodiments may therefore permit the continuous improvement in a correlation of the child and/or infant behavior, which may increase the likelihood of identification of a cause or contributor to an issue, problem, and or stress.

In yet another exemplary embodiment, machine learning modules may operate by receiving input from one or more sensors and determining a child's behavior, emotion, or current state by comparing the received input with prior received input and human behaviors, emotions, or states of the child.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed hereto, they are used in a generic and descriptive sense only and not for purposes of limitation.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A child monitoring system, comprising:
at least one audio sensor, located at a first location, configured to capture a speech data associated with a child;
at least one video sensor, located at a second location, configured to capture an activity data associated with the child;
an input module, configured to receive one or more child parameters, wherein the one or more child parameters comprise age, gender and at least one of height and weight;
a processing module comprising:
a speech recognition module configured to receive the speech data from the at least one audio sensor, and determine a first category information and a time associated with the first category information in response to computation of the speech data associated with the child by using a speech recognition machine learning module;
an activity recognition module configured to receive the activity data from the at least one video sensor, and determine a second category information in response to computation of the activity data by using an activity recognition machine learning module;
a classifier module configured to receive the first category information and the time associated with the first category information from the speech recognition module, and receive the second category information from the activity recognition module, and one or more child parameters from the input module;
wherein the classifier module comprises a suggestion machine learning module, the classifier module being configured to:
generate a first suggestion in response to a presence of at least one or more suggestions associated with the first category information, the time associated with the first category information, the second category information, and one or more child parameters in a suggestion database, and
when the suggestion database does not contain the at least one or more suggestions associated with the first category information, the time associated with the first category information, the second category information, and the one or more child parameters for generating the first suggestion, the classifier module is further configured to generate a second suggestion in response to a presence of at least one or more suggestions associated with the first category information, the time associated with the first category information, the second category information, and one or more child parameters in a predefined child development database; and
a display module configured to display the first suggestion or the second suggestion received from the classifier module;
wherein the suggestion database is configured to be updated in response to receiving an input from the display module generated from the interaction with the first suggestion or the second suggestion displayed on the display module.

2. The system of claim 1, wherein the first category information is at least one of crying, sad, happy, angry, tired, frustrated, bored, delighted, extremely delighted, discomfort, positive, neutral, negative, very disappointed, hungry, frustrated, confused, overstimulation, development crying, thirst crying, teething crying, and sleepiness.

3. The system of claim 1, wherein the time is at least one of morning, afternoon, evening, and night.

4. The system of claim 1, wherein the second category information is at least one of running, playing, eating, crawling, lying down, standing up, and sleeping.

5. The system of claim 1, wherein the predefined child development database comprises suggestions related to a growing and developing child.

6. The system of claim 1, wherein the speech data is at least one of acoustic data, lexical data, and linguistic data.

7. A child monitoring method, comprising:
capturing speech data associated with a child using an audio sensor;
capturing activity data associated with the child using a video sensor;
receiving one or more child parameters, wherein the one or more child parameters comprise age, gender and at least one of height and weight;
determining a first category information and a time associated with the first category information in response to computation of the speech data, the speech data being received by a speech recognition module of a processing module, the speech recognition module using a speech recognition machine learning module;
determining a second category information in response to computation of the activity data, the activity data being received by an activity recognition module of the processing module, the activity recognition module using an activity recognition machine learning module;
receiving, by a classifier module of the processing module, the first category information and the time associated with the first category information from the speech recognition module, the second category information from the activity recognition module, and one or more child parameters;
wherein the classifier module comprises a suggestion machine learning module, the classifier module being configured for:
generating a first suggestion in response to a presence of at least one or more suggestions associated with the first category information, the time associated with the first category information, the second category information, and one or more child parameters in a suggestion database, and
when the suggestion database does not contain the at least one or more suggestions associated with the first category information, the time associated with the first category information, the second category information, and the one or more child parameters for generating the first suggestion, the classifier module is further configured to generate a second suggestion in response to a presence of at least one or more suggestions associated with the first category information, the time associated with the first category information, the second category information, and one or more child parameters in a predefined child development database;
displaying, by a display module, the first suggestion or the second suggestion received from the classifier module; and
updating the suggestion database in response to receiving an input from the display module generated from the interaction with the first suggestion or the second suggestion displayed on the display module.

8. The method of claim 7, wherein the first category information is at least one of crying, sad, happy, angry, tried, frustrated, bored, delighted, extremely delighted, discomfort, positive, neutral, negative, very disappointed, hungry, frustrated, confused, overstimulation, development crying, thirst crying, teething crying, and sleepiness.

9. The method of claim 7, wherein the time is at least one of morning, afternoon, evening, and night.

10. The method of claim 7, wherein the second category information is at least one of running, playing, eating, crawling, lying down, standing up, and sleeping.

11. The method of claim 7, wherein the predefined child development database comprises suggestions related to a growing and developing child.

12. The method of claim 7, wherein the speech data is at least one of acoustic data, lexical data, and linguistic data.

* * * * *